US009049585B1

(12) United States Patent
Hoffman et al.

(10) Patent No.: US 9,049,585 B1
(45) Date of Patent: Jun. 2, 2015

(54) METHOD OF PROVIDING ADDITIONAL INFORMATION TO EMERGENCY SERVICES ABOUT EMERGENCY LOCATOR BEACONS

(71) Applicants: Christopher Paul Hoffman, Fareham (GB); William Cox, Sunrise, FL (US); Thomas J. Pack, Boca Raton, FL (US)

(72) Inventors: Christopher Paul Hoffman, Fareham (GB); William Cox, Sunrise, FL (US); Thomas J. Pack, Boca Raton, FL (US)

(73) Assignee: ACR ELECTRONICS, INC., Fort Lauderdale, FL (US)

( * ) Notice: Subject to any disclaimer, the term of this patent is extended or adjusted under 35 U.S.C. 154(b) by 119 days.

(21) Appl. No.: 13/959,798

(22) Filed: Aug. 6, 2013

Related U.S. Application Data

(63) Continuation-in-part of application No. 13/772,799, filed on Feb. 21, 2013, and a continuation-in-part of application No. 13/772,780, filed on Feb. 21, 2013.

(60) Provisional application No. 61/680,950, filed on Aug. 8, 2012.

(51) Int. Cl.
*H04B 3/36* (2006.01)
*H04W 4/22* (2009.01)

(52) U.S. Cl.
CPC ...................................... *H04W 4/22* (2013.01)

(58) Field of Classification Search
USPC .......... 455/403, 404.1, 404.2, 3.02, 427, 428, 455/12.1, 13.1, 13.2
See application file for complete search history.

(56) References Cited

U.S. PATENT DOCUMENTS

| | | | |
|---|---|---|---|
| 5,519,403 A | 5/1996 | Bickley et al. | |
| 6,275,164 B1 * | 8/2001 | MacConnell et al. | ........ 340/692 |
| 6,771,163 B2 | 8/2004 | Linnett et al. | |
| 7,215,282 B2 | 5/2007 | Boling et al. | |
| 7,492,251 B1 * | 2/2009 | Katz | ........................ 340/539.22 |
| 7,675,423 B2 | 3/2010 | Boling et al. | |
| 7,830,305 B2 | 11/2010 | Boling et al. | |
| 7,991,380 B2 | 8/2011 | Collins et al. | |
| 8,018,332 B2 | 9/2011 | Boling et al. | |
| 8,098,190 B2 * | 1/2012 | Bishop et al. | .................... 342/60 |
| 2008/0191863 A1 * | 8/2008 | Boling et al. | ................. 340/521 |
| 2010/0103042 A1 * | 4/2010 | Bishop et al. | ............ 342/357.16 |
| 2010/0271198 A1 | 10/2010 | Boling et al. | |

* cited by examiner

*Primary Examiner* — Fayyaz Alam
(74) *Attorney, Agent, or Firm* — Malin Haley DiMaggio & Bowen P.A.

(57) ABSTRACT

An emergency locating communications device that includes an emergency locator beacon that transmits emergency signals at 406 MHz and a SEND commercial satellite transmitter and receiver is provided. The communications device can be identified for both 406 MHz originator and SEND capable emergency locator device to an emergency services provider by sending a first message to the emergency services provider including a unique identity number of the 406 MHz transmitter of the device and. sending a second message to the emergency services providing including an International Mobile Equipment Identity number of the SEND transmitter of the device. The second message further includes at least a portion of the unique identity number of the 406 MHz transmitter of said device such that the emergency services provider can process the first and second messages to identify both the 406 MHz transmitter and the SEND transmitter of said emergency locator device.

3 Claims, 3 Drawing Sheets

| | Bit Synchronization | Frame synchronization | First Protected Data Field (PDF-1) | | | | BCH-1 | Non-Protected Data Field |
|---|---|---|---|---|---|---|---|---|
| Unmodulated Carrier (160 m) | Bit Synchronization Pattern | Frame synchronization Pattern | Format Flag | Protocol Flag | Country Code | Identification or Identification plus Position | 21-Bit BCH Code | Emergency Code/ National Use or Supplement Data |
| Bit No. | 1-15 | 16-24 | 25 | 26 | 27-36 | 37-85 | 86-106 | 107-112 |
| | 15 bits | 9 bits | 1 bit | 1 bit | 10 bits | 49 bits | 21 bits | 6 bits |

Fig. 2A: Data Fields of the Short Message Format

| | Bit Synchronization | Frame synchronization | First Protected Data Field (PDF-1) | | | | BCH-1 | Second Protected Data Field (PDF-2) | BCH-2 |
|---|---|---|---|---|---|---|---|---|---|
| Unmodulated Carrier (160 m) | Bit Synchronization Pattern | Frame synchronization Pattern | Format Flag | Protocol Flag | Country Code | Identification or Identification plus Position | 21-Bit BCH Code | Supplementary and position or National Use Data | 12-Bit BCH Code |
| Bit No. | 1-15 | 16-24 | 25 | 26 | 27-36 | 37-85 | 86-106 | 107-132 | 133-144 |
| | 15 bits | 9 bits | 1 bit | 1 bit | 10 bits | 49 bits | 21 bits | 26 bits | 12 bits |

Fig. 2B: Data Fields of the Long Message Format

| Bits | 25 | 26 | 27 36 | 37 40 | 85 | 86 106 | 107 132 | 133 144 |
|---|---|---|---|---|---|---|---|---|
| | F | 1 | Country code | 100 | National Use (40 bits) | BCH Code (21 bits) | National use (26 bits) | BCH Code (12 bits) |

| Bits | Usage |
|---|---|
| 25 | format flag (short message =0, long message =1) |
| 26 | protocol flag (=1) |
| 27-36 | country code |
| 37-39 | national user protocol code (=100) |
| 40-85 | national use |
| 86-106 | 21-bit BCH code |
| 107-112 | national use |
| 123-132 | national use (if long message) |
| 133-144 | 12-bit BCH code (if long message) |

Fig. 3

| National Use Long Message | | | | | | | | | |
|---|---|---|---|---|---|---|---|---|---|
| Message Bit | 1 to 24 | 25 | 26 | 27 to 36 | 37 38 39 | 40 to 85 | 86 to 106 | 107 to 132 | 133 to 144 |
| Function | Bit & Frame Sync. | FF | FF | Country Code | Protocol | National Use | BCH-1 | National Use | BCH-2 |
| Comments | Fixed | 1 | 1 | USA 366 | Nat. Use | See below | Error Corr. | See below | Error Corr. |

| Bits 40 to 85 | | | | Bits 107 to 132 |
|---|---|---|---|---|
| Bits 40 to 59 | 60 | 61 | Bits 62 to 85 | Bits 107 to 132 |
| Bits 50 to 69 of Normal Message | Sp | Sp | First 24 Bits of SEND Identity | Last 26 Bits of SEND Identity |
| 15 Hex ID Characters 7 to 11 | | | SEND 50 Bit (15 Numerical) Unique Identity | |

Fig. 4

METHOD OF PROVIDING ADDITIONAL INFORMATION TO EMERGENCY SERVICES ABOUT EMERGENCY LOCATOR BEACONS

CROSS REFERENCE TO RELATED APPLICATIONS

This application is a continuation-in-part of co-pending U.S. patent application Ser. No. 13/772,799 filed on Feb. 21, 2013. This application is also a continuation-in-part of co-pending U.S. patent application Ser. No. 13/772,780 filed on Feb. 21, 2013. This application also claims the benefit of U.S. Provisional Application No. 61/680,950, filed Aug. 8, 2012.

BACKGROUND OF THE INVENTION

1. Field of the Invention

The present invention relates to emergency locator and communication beacons and more specifically to a method of providing additional identification information to emergency services about emergency locator beacons.

2. Description of Related Art

The Cospas-Sarsat international satellite system has been operational for many years and is well known. Its sole purpose is to provide emergency distress alerting capability from an aircraft, vessel or individual in distress to relevant emergency services, via a one way satellite communications network. The system employs three types of emergency locator beacons known as Emergency Locator Transmitters (ELTs), Emergency Position Indicating Radio Beacons (EPIRBs) and Personal Locator Beacons (PLBs) all operating in the 406.0 to 406.1 MHz frequency band. Each of these beacons transmits a digital message containing digital data that includes the unique identity of the beacon. The format of this digital message is defined in international standards and is comprised of a number of different data fields, each of which contains different data depending on the particular message format of which there are a number to address differing administrations and equipment requirements.

The system is unique in that it is truly global and is run by various governments for the benefit of all and sends emergency distress alerts directly to the relevant government authority responsible for rescue efforts (e.g. US Coastguard) around the world. The Cospas-Sarsat system provides a one way communications link between a beacon and one or more Cospas-Sarsat satellites. The Cospas-Sarsat satellites are in communication with one or more dispatchers who are responsible for routing a distress signal from a beacon to the appropriate first responders who carry out the rescue efforts. Specifically, the Cospas-Sarsat satellites receive a distress signal and route the distress signal to one or more receiving and processing stations called LUTs, or local user terminals. The LUTs generate distress alert data which is then communicated to a Mission Control Center (MCC) whereby the MCC then routes instructions and information to localized Rescue Coordination Centers (RCC). The RCCs are then responsible for facilitating the coordination of the rescue efforts. While the Cospas-Sarsat system is effective, it is limited in that it only provides for one way communication, i.e. from the beacon to the responders, which can result in the omission of vital information to aid the rescue effort for the person(s) in distress as well as for the responders.

More recently, commercial satellite communication systems utilizing both one way (remote user to satellite ground station only (e.g. Globalstar SPOT) or satellite ground station to remote user only (e.g. Sirius XM radio)) and two way communications have become more common and have started to be used for both emergency distress alerting and general day to day communications. These satellite communication systems are particularly useful in locations where cellular telephone antennas cannot be placed and/or where cellular telephone reception is low or non-existent. Satellite communications systems have been tailored for emergency communications through the adoption and use of Satellite Emergency Notification Devices (SENDs). Globalstar SPOT is one example of a one way version of such a device and the DeLorme InReach device is one example of a two way version of such a device. Typically, a satellite communication system operates by creating a one-way or two-way communications link between a satellite telephone or SEND and a commercial communications satellite. The commercial communications satellite may comprise the Iridium satellite system already established in the art. The communications satellite is further in communication with a satellite gateway whereby the gateway is in communication with one or more computer servers. The computer servers typically have connects to the internet, cellular telephone systems, or standard land-line telephone systems thereby allowing the satellite phone or SEND user to communicate with a plurality of other devices by way of a plurality of communications systems. In some instances, the computer servers may be in communication with a particularized commercial emergency response call center that carries out specific emergency rescue operations should the satellite phone or SEND use request them or by the pressing of an "emergency" key on his device.

There are several advantages of SEND devices compared to 406 MHz beacons in that the SEND devices permit communications other than pure emergency distress alerting and thus can be used on a regular basis to remain in communication even when outside of an area of cellular phone coverage. In addition, SEND devices can be used to track and report on the location of the remote person as well through the use of internal GPS receivers typically found in a SEND device. In addition, because SEND devices and satellite telephones permit two-way communications, in an emergency situation some of the satellite devices can provide to the user additional information on the emergency and rescue efforts and some can even permit communication with the person in distress by voice, data, or text message.

However, SEND devices also suffer from some disadvantages compared to 406 MHz beacons in that the SEND devices currently have to forward distress alerts to a commercial emergency call center (e.g. a 911 call center) and this call center then has to communicate with the relevant emergency services. It is then difficult for the relevant emergency services to communicate backwards and forwards with the person in distress because the system is not cohesively and centrally established for emergency and rescue efforts.

Further still, while both the 406 MHz beacons and SEND systems have built in redundancy to allow for outages in parts of the system, each system is still dependent upon a single communications system that may break down or become unreliable in what can often be a life threatening situation.

FIG. 1 demonstrates an improved system which is a combination of a 406 systems and a SEND system, referred to as a 406-SEND system. The system combines the radio frequency emergency alerting benefits of the Cospas-Sarsat system and the two-way communications benefits of a satellite-based SEND system. This combination provides a world class distress alerting system over the Cospas-Sarsat network together with both a secondary system of distress alerting over commercial satellite systems, permitting government agencies to communicate with the person in distress as well as receive robust emergency distress signals. The functionality of this combined system is described and claimed in U.S. patent application Ser. Nos. 13/772,799 and 13/772,780 to which the present application claims priority and of which are incorporated by reference in their entireties herein.

In order for the operator of emergency services to communicate back to the person in distress using the SEND part of the device, the operator must first know the unique identity of the SEND part of the device. Often times, the unique identity is established as an International Mobile Equipment Identity (IMEI) number, which is typically not a part of the 406 distress alert transmission. A 406 beacon transmits a 406 identifier along with distress signals. The format of the beacon identifier is established by international standards. The 406 beacon identifier signal consists of a number of different data fields, each of which contains different data depending on the particular message format. In some embodiments, the fields comprise a Country Code field, a Beacon Serial Number field, a Meacon MMSI field (used to indicate the number of the vessel upon which an EPIRB is fitted), a Beacon Aircraft Tail Number field (used to indicate the aircraft on which an ELT is installed) and the like. The information in these data fields is used by an operator at emergency services to assist in a rescue mission and to help eliminate a false alert whenever a beacon is activated by mistake.

Having an operator that is able to communicate with the person in distress is a great advantage in the event of a distress situation or even in the case where a false alert has been generated. However, in order to do this, the operator at emergency services must know the identity of the SEND part of the user's emergency beacon, which identity information is not typically transmitted in the 406 Cospas-Sarsat system. Therefore, the most practical way to provide the identity of the SEND part of the user's system is to include the identity information with the 406 beacon identifier information so that both 406 beacon identity and SEND identity information are sent to the emergency services at the same time. However, the existing 406 beacon system message signal digital data structure does not provide enough free or spare data bits to enable SEND identity information to be included with the 406 beacon signal. Accordingly, there is a need in the art to solve this problem by finding a way to include SEND identity information with the 406 emergency beacon system information in light of the limited space available in the data stream of the 406 system beacon emergency signal transmissions.

It is, therefore, to the effective resolution of the aforementioned problems and shortcomings of the prior art that the present invention is directed. However, in view of the emergency beacons and related systems in existence at the time of the present invention, it was not obvious to those persons of ordinary skill in the pertinent art as to how the identified needs could be fulfilled in an advantageous manner.

SUMMARY OF THE INVENTION

A method and system for identifying a dual band 406 MHz and SEND capable emergency locator device to an emergency services provider by sending a first message to the emergency services provider including a unique identity number of the 406 MHz transmitter of the device and sending a second message to the emergency services providing including an International Mobile Equipment Identity number of the SEND transmitter of the device. The second message further includes at least a portion of the unique identity number of the 406 MHz transmitter of said device such that the emergency services provider can process the first and second messages to identify both the 406 MHz transmitter and the SEND transmitter of said emergency locator device.

In some embodiments, the unique identity number of the 406 MHz transmitter comprises a 15 digit hexadecimal number. In some embodiments, digits 7-11 of the 15 digit hexadecimal unique identity number are embedded in the second message such that the emergency services provider can process and analyze both messages to identify the emergency device and respond accordingly.

Accordingly, it is an object of the present invention to provide a method by which to identify both transmitters of a dual-band emergency locator device utilizing a single message embedded with information sufficient to identity both transmitters.

It is yet another object of the present invention to provide a method and means by which to identify the SEND transmitter/receiver of a dual-band 406-SEND emergency locator device by sending a message of the 406 system wherein the message includes at least a portion of the unique identify number of the 406 MHz transmitter and the IMEI number of the SEND transmitter/receiver.

It is yet another object to the present invention to provide a method and means of by which to identify the SEND transmitter/receiver of a dual-band 406-SEND emergency locator device without having to receive a communication from the device over the SEND system.

In accordance with these and other objects which will become apparent hereinafter, the instant invention will now be described with particular reference to the accompanying drawings.

DESCRIPTION OF THE DRAWINGS

FIGS. 2A and 2B are exemplary descriptions of a standard 406 system message formats in both long and short formats.

FIG. 3 is an exemplary description of a National User protocol 406 system message format.

FIG. 4 is an exemplary description of one embodiment of the message format utilized in the method of the present invention.

DETAILED DESCRIPTION OF THE INVENTION

Figure 1:
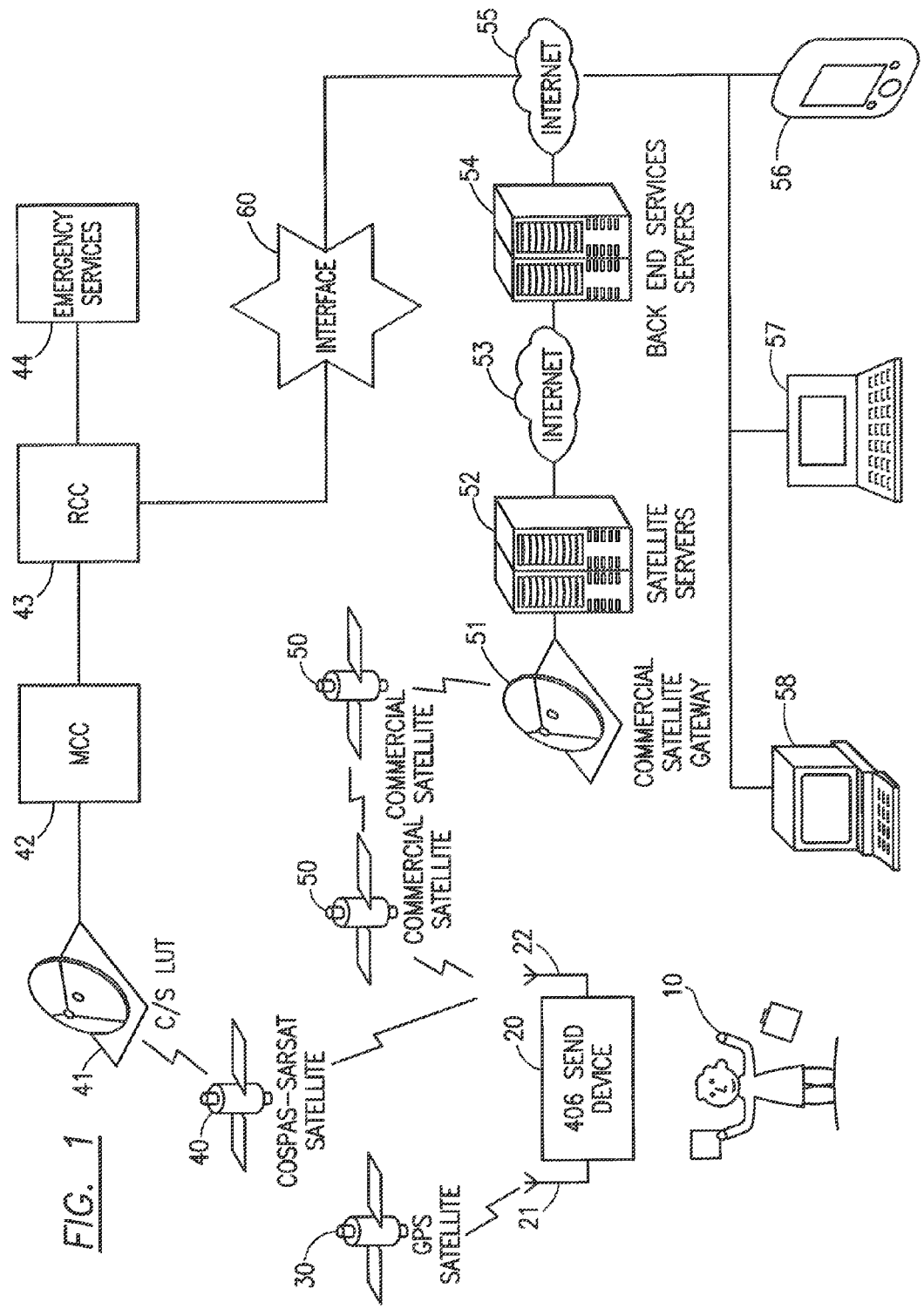
FIG. 1 is a schematic of one embodiment of a combined 406-SEND emergency communications system.

With reference to FIG. 1, shown is a schematic of one embodiment of the system and method of the present invention. Shown is a user 10 who operates 406-SEND Device 20. User 10 may be a person requiring rescue or may simply be a person desirous of communicating via device 20. 406-SEND device 20 includes one or more transmitter/receivers 21 and 22. In some embodiments, receiver 21 is a global positioning system (GPS) receiver that is capable of receiving location information from one or more GPS satellites 30. In some embodiments, transmitter/receiver 22 is a dual-purpose transmitter/receiver configured to simultaneously and/or selectively transmit a 406 MHz test or emergency signal to the 406 MHz Cospas-Sarsat satellite system 40 and transmit and receive communications with a commercial satellite communications system 50. It is appreciated that where the Cospas-Sarsat system is only a one-way communication system, the transmitter/receiver 22 is configured for that one-way communication. Further, transmitter/receiver 22 is configured for two-way communication by way of a commercial satellite system. In some embodiments, the 406-SEND device 20 includes identifiers embedded in the transmitter/receivers 21 and 22 such that the identity of the 406-SEND device 20 can be determined. It is appreciated that the transmitter/receiver 22 may comprise a 406 MHz transmitter and a SEND transmitter both capable of communicating simultaneous in accordance with the system shown in FIG. 1.

406-SEND device 20 is configured to selectively transmit 406 MHz signals by way of transmitter/receiver 22 to one or more Cospas-Sarsat satellites 40 and transmit and receive communications with one or more commercial satellites 50. Accordingly, in some embodiments, 406-SEND device 20 is in communication with Cospas-Sarsat satellite 40 which is in turn in communication with one or more local user terminals (LUT) 41. A user 10 may generate a 406 MHz distress signal on his 406-SEND device 20 which signal is then relayed first to the Cospas-Sarsat satellite 40 and then to the LUT 41. The LUT 41 is then capable of generating distress alert data which is then communicated to a Mission Control Center (MCC) 42 whereby the MCC 42 then routes instructions and information to one or more localized Rescue Coordination Centers (RCC) 43. The RCCs 43 are then responsible for facilitating the coordination of the rescue efforts and, in some embodiments, are in communication with local emergency services 44 who carry out the actual rescue.

On the other hand, in some embodiments, the 406-SEND device 20 is in communication with one or more commercial satellites 50 which are tasked with relaying various satellite telephone communications. In some embodiments, the one or more commercial satellites 50 are in communication with a commercial satellite gateway 51 which functions as a relay point between the ground services (discussed herein) and the satellites 50. The "ground services" comprise a series of interconnected computer systems including one or more satellite servers 52 which may be in communication with the Internet 53 and further in communication with one or more back end services servers 54 which may also be in communication with the Internet 55. The back end services servers 54 are capable of communicating with a plurality of devices which allow two-way communication between those devices and the 406-SEND device 20 in the field. In some embodiments, these devices include: a cellular telephone 56 for voice, data, and text services; a personal computing device 57 such as a laptop, desktop, or mobile device for voice, data, and text (e-mail) services; and a 406-SEND-specific user interface device 58 for voice, data, and text services. The foregoing commercial satellite configuration allows for the establishment of a bi-directional communications link between one or more 406-SEND devices 20 and one or more other devices such as the aforementioned personal computer, mobile device, cellular telephone, or 406-SEND interface.

To further enhance the reliability and usefulness of the system and method of the present invention, an interface 60 is provided to establish a communications link between the back end services server 54 of the commercial satellite system and the one or more RCCs 43. In some embodiments, the back end services server 54 utilizes its internet connection 55 to communicate with RCC 43 over interface 60. In some embodiments, the interface 60 may be configured to bypass the MCC 42 and RCC 43 to be in direct communication with the C/S LUT 41. The interface 60 is a specialized and critical component which allows the Cospas-Sarsat system 40 to communicate directly with the commercial satellite system 50 in order to provide a more robust, complete, and integrated set of communications and emergency services. In some embodiments, interface 60 may comprise an automated communications interface that is established as a joint effort by both the Cospas-Sarsat system and the commercial satellite system. In other embodiments, interface 60 may comprise a discrete third-party service provider whose primary function is to facilitate communications between the Cospas-Sarsat system and the commercial satellite system. Accordingly, interface 60 may comprise either a passive communications link or an active communications link between the Cospas-Sarsat system and the commercial satellite (SEND) system. In some embodiments, the "active" link comprises a service provider employing one or more computer networks to provide a robust set of communications services. In some embodiments, interface 60 functions as an interface to expand the one-way communications capabilities of the already-established Cospas-Sarsat system to allow for two-way communication thereof by way of the commercial satellite (SEND) system.

In some embodiments of the present invention, the device 20 includes a hexadecimal identification number corresponding to the 406 MHz Cospas-Sarsat communication protocol that it is capable of transmitting over. In some embodiments, the device 20 also includes an IMEI (International Mobile Station Equipment Identity) number corresponding to the SEND commercial satellite communication protocol that device 20 is capable of transmitting over. Accordingly, the present invention comprises a method of including SEND identity information along with 406 MHz system identity information over the 406 system. This allows the emergency services to identify both aspects of the user's emergency beacon device 20 in order to initiate an emergency response as well communicate back to the user by way of the SEND system, without the need to have the SEND identifier information previously stored.

The current 406 MHz message structure is defined in Annex A of the Specification for Cospas-Sarsat 406 MHz Distress Beacons C/S T.001. An excerpt of this annex is provided in FIGS. 2A-2B, showing that there are two types of message formats: a "short" format and a "long" format. A short message contains 112 data bits and a long message contains 144 data bits, broken up into fields with predefined uses. The fields are allocated such that no two beacons will ever contain exactly the same combination of data in bits 26 to 85 of the message, thus creating the 406 beacon's Unique Identity Number (UIN) which is usually presented as a 15 character Hexadecimal string (e.g. ADCF09002440800). This is the identity by which the beacon is known and that is sent along with emergency messages from the beacon to the emergency services. Of course, the hexadecimal string would only identify the 406 MHz transmitter in the case of a dual 406-SEND device 20.

There are typically only 2 or 3 spare bits in each Cospas-Sarsat 406 message. A typical SEND identifier, such as the aforementioned IMEI number consisting of a 15 digit number string, requires 50 bits to code in binary. Thus, it is not possible to include the IMEI number along with the 406 MHz hexadecimal identifier in a standard 406 message. However, the 406 MHz system provides a specialized "National User" message format which provides enough free data bits to allow for the transmission of the SEND identity information simultaneously with the 406 system identity information. FIG. 3 is a chart describing the specifications of the National User message format.

The 406 MHz Cospas-Sarsat National User protocol provides a total of 72 unallocated bits (46+26 as shown in FIG. 3) in a "long message" format which bits can be utilized to provide the required SEND identity information. However, the National User protocol does not contain the 406 Beacon UIN and there is no way to reconstruct it from the transmitted data. Accordingly, it would not be possible to identify both the 406 beacon and the SEND device utilizing only the 406 MHz Cospas-Sarsat National User protocol.

However, referring to FIG. 4, the present invention provides a means to include all or part of the 406 beacon/transmitter's unique identification number along with the IMEI of the SEND transmitter/receiver by way of the 406 MHz Cospas-Sarsat National User protocol. As shown in FIG. 4, a portion of the device's 20 406 system UIN 15 digit Hexidecimal ID is included in a National User protocol message as a means to identify the 406 system aspects of the device 20. In some embodiments, digits 7-11 of the 15 digits are utilized. The digits have been selected as they represent the most variable section of the 15 Hex UIN and therefore are the most likely to create a reasonably unique identity. By only including one third of the 15 Hex ID, it is accepted that duplicate UINs could occur, however the probability of a duplicated code being transmitted as an emergency distress alert at the same time is considered to be very small and even if a duplicate is transmitted, there would be little if any impact on the overall system functionality and response. As shown in FIG. 4, in some embodiments, utilizing the present invention will leave two spare bits (60 and 61) and the remainder of the message is utilized to transmit a 50 bit number which represents the IMEI of the SEND system, or the SEND identity generally.

The present invention also provides a method of tying or linking the SEND identity data to the 15 digit HEX identity of the 460 system/beacon. In some embodiments, this is accomplished by alternating transmissions from the 406 beacon such that a number of transmissions contain the normal beacon data shown in FIG. 2 and interleaved between these are one or more transmissions containing the SEND identity shown in FIG. 4. The emergency services can then marry up the middle 5 digits (15 Hex ID characters 7-11) of the 406 MHz National User protocol transmission with the normal 406 beacon transmission full 15 HEX ID and thus establish the SEND part of the device's unique identity and use this to establish two-way communications with the person in distress. In other words, in some embodiments, the present method comprises embedding at least a portion of the 406 beacon's UIN within the 406 MHz National User protocol message, which National User Protocol also contains the entirety of the SEND device's IMEI and alternating between sending the modified National User protocol message and a standard 406 beacon/system message (which contains the entirety of the 406 beacon's UIN), and subsequently matching up the two messages to achieve a complete identification of both the 406 system and SEND aspects of the user's device 20. In other embodiments, more than one modified National User protocol message may be sent before the standard 406 MHz message is sent, i.e. a 2 to 1, 3 to 1, 4 to 1 ratio.

In addition to utilizing the existing National User protocol, the present invention also contemplates establishing a new 406 system communications protocol wherein all or a portion of both 406 system and SEND system identifies can be included. In some embodiments, such a protocol includes at least 99 bits of space for the inclusion of both 15 character identifiers. Other existing 406 system protocols could be used as well.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method of identifying an emergency locator device to an emergency services provider, comprising:
    providing a communications device having an emergency locator 406 MHz beacon for transmitting emergency signals to the Cospas-Sarsat satellite system;
    providing a Satellite Emergency Notification Device (SEND) transmitter and receiver in said communications device for transmitting and receiving communications with a commercial satellite communications system that includes an emergency services provider;
    sending a first message to said emergency services provider, said first message including a unique identity number of a 406 MHz transmitter of said device;
    sending a second message to said emergency services provider, said second message including an International Mobile Equipment Identity number of the Satellite Emergency Notification Device transmitter of said device;
    wherein said second message further includes at least a portion of said unique identity number of a 406 MHz transmitter of said device;
    wherein said emergency services provider processes said first and second messages to identify both said 406 MHz transmitter and said Satellite Emergency Notification Device transmitter of said emergency locator device.

2. The method of claim 1, wherein said unique identity number of said 406 MHz transmitter of said device comprises a 15 digit hexadecimal string.

3. The method of claim 2, wherein at least a portion of said unique identity number comprises digits 7 through 11 of said 15 digit hexadecimal string.

* * * * *